June 6, 1967   A. GOETZ   3,323,365
FLOW METER SYSTEM
Filed June 30, 1964

INVENTOR.
ALEXANDER GOETZ
BY
Lyon & Lyon
ATTORNEYS

United States Patent Office 3,323,365
Patented June 6, 1967

3,323,365
FLOW METER SYSTEM
Alexander Goetz, Altadena, Calif., assignor to California Institute Research Foundation, Pasadena, Calif., a corporation of California
Filed June 30, 1964, Ser. No. 379,258
3 Claims. (Cl. 73—195)

This invention relates to flow meter systems and included in the objects of this invention are:

First, to provide a flow meter system which is particularly applicable for accurate quantitative measurement of gas flow in a conduit communicating with a source of suction or pressure which is sensitive to flow restrictions.

Second, to provide a flow meter system which senses the flow rate of a gas without any resistance to flow; that is, the flow meter by its presence does not modify the rate of the flow of the gas.

Third, to provide a flow meter system which is connected to the conduit through which the gas to be measured is flowing by providing a pressure or suction in the meter tube precisely balancing the suction or pressure exerted by the flowing gas to be measured so that no change occurs in the pressure conditions at the channel in which the flow rate is of interest. The balancing pressure supplied by the source of fluid flow such as a pump is measured by a meter to provide readings from which the flow rate may be calculated or by calibration read directly.

With the above and other objects in view as may appear hereinafter, reference is directed to the accompanying drawings in which.

Figure 1:
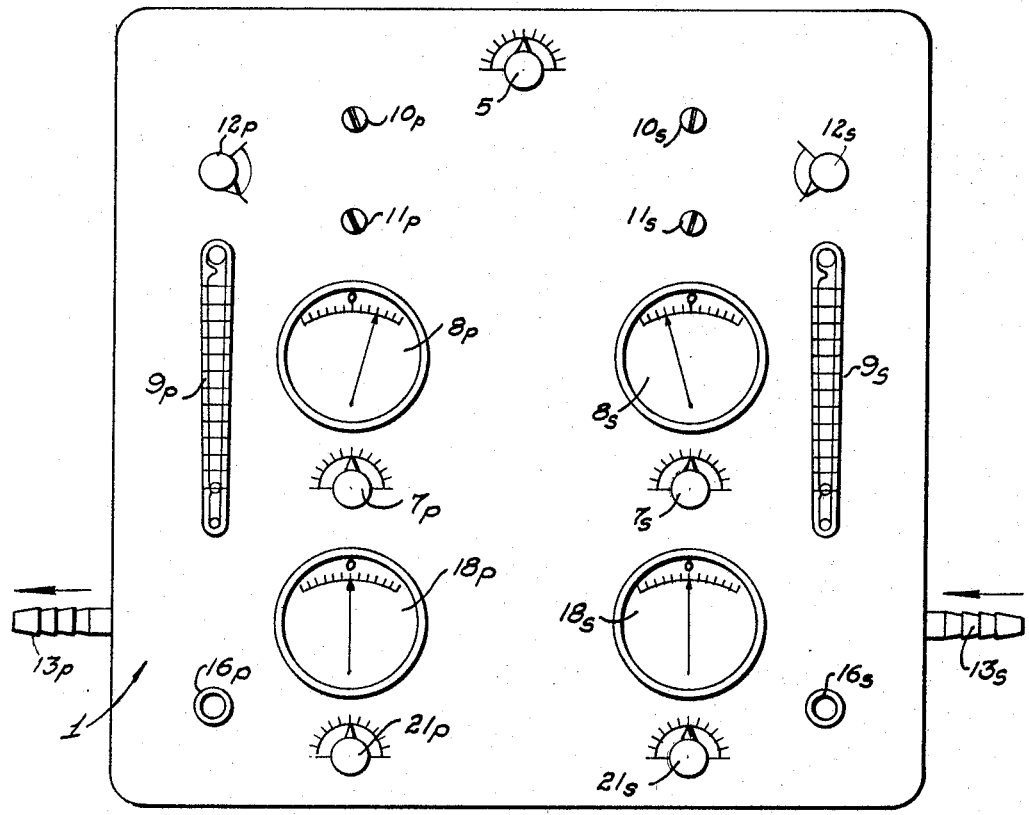
FIGURE 1 is a front view of a meter housing the flow meter system and the various gauges and the control knobs of the various valves.

The flow meter involves two identically arranged, mutually independent systems, the elements of which are designated by the letter "s" to represent suction, and by the letter "p" to represent pressure. Both systems are manipulated in the same manner and are utilized in connection with unknown values in systems which have, respectively, a pressure outlet or a suction inlet which can be connected to the meter.

The meter includes a housing 1, containing a small rotary air pump 2 connected to an intake or suction line 3s and to a discharge or pressure line 3p. A bypass 4 having a valve 5 connects the intake and discharge sides of the pump 2. The extremity of the suction line 3s is adapted to be connected to a pressure source 6p, the flow in which is to be measured. Similarly the extremity of the pressure line 3p is adapted to be connected to a suction source 6s, the negative pressure or suction of which is to be measured.

Each line 3s and 3p have, in order from the pump 2 to their extremities, control valves 7s and 7p, sensitive differential pressure meters 8s and 8p, and tapered tube flow meters 9s and 9p. The meters 8s and 8p may be of the type shown in U.S. Patent No. 2,722,837 and are calibrated to read rate of flow so as to indicate as flow meters. To accomplish this, the flow meters 8s and 8p are bridged, respectively, by preadjusted bypass valves 10s, 11s, and 10p, 11p. One or more selector valves 12s and 12p are so located that one or more of the bypass valves may shunt the corresponding flow meter 8s to 8p to provide one or more calibrated scalar ranges.

Beyond the tapered tube flow meters 9s and 9p, the flow lines 3s and 3p are provided with fittings 13s and 13p so that the remainder of the flow lines joined to the pressure or suction sources may be detachable, flexible tubes.

Between the fittings and the tapered tube flow meters, the flow lines 3s and 3p are provided with cross connections 14s and 14p, respectively, which provide branches 15s and 15p terminating in bleed ports 16s and 16p. These are normally open and are dimensioned to be closed by one's finger.

The cross connections 14s and 14p also provide branches 17s and 17p in which are interposed sensitive null reading meters 18s and 18p, respectively. These may be the same type as meters 8s and 8p with one side exposed to ambient pressure.

The flow lines 3s and 3p are provided between the control valves 7s and 7p and meters 8s and 8p, with branch lines terminating in accumulators or buffer chambers 19s and 19p, respectively, the accumulators minimize pressure pulsations of the pump 2. Between the pump 2 and the control valves 7s and 7p, there are provided branch lines 20s and 20p having open ends. Interposed in these branch lines are control valves 21s and 21p.

The pressure line 3p may be provided with a filter 22, in order to prevent contamination of the system by the outflow from the pump.

Figure 2:
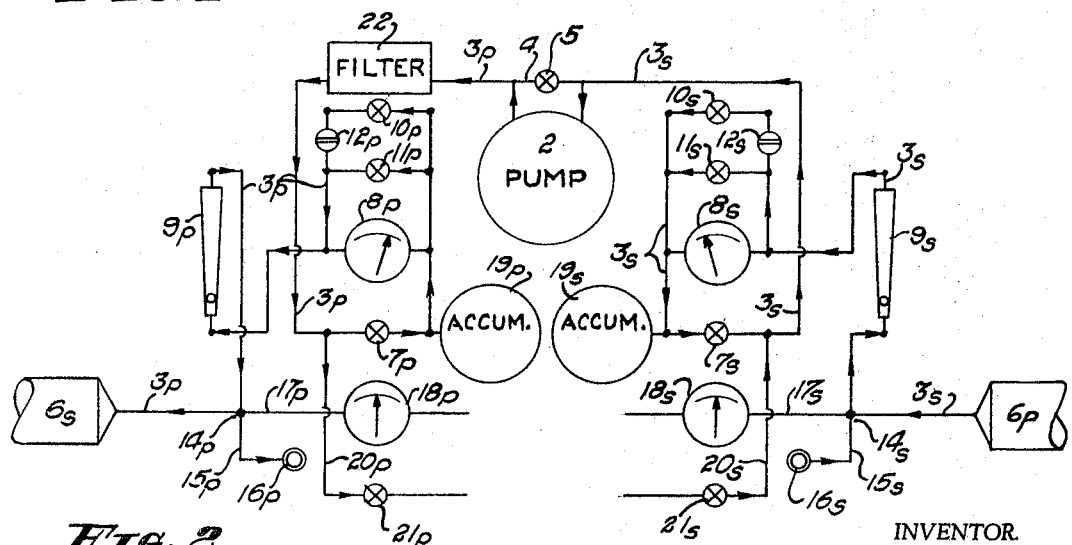
FIGURE 2 is a schematic view illustrating the operation of the flow meter system.

As previously indicated, the two independent systems are mirror images (with the exception of filter 22) and their operation is identical. Accordingly, to simplify this description, only the suction side of the system (the left-hand portion of FIGURE 2) will be specifically described.

Operation of the flow meter is as follows:

If before starting the pump 2, the line 3p is connected at 6s to a suction source which has an unknown rate of inflow, the fluid moving toward said source will be supplied from the open bleed port 16p and also through branch line 20p controlled by the valve 21p. Under this condition fluid will be flowing into the system at 16p and 21p to supply the vacuum fluid requirement and the meters 8p and 9p will be activated and the meter 18p will show a negative pressure. It should be noted, however, that such a reading will not be a true reading of flow rate since energy lost in the system and in activation of the meters impairs the flow particularly when pressure sensitive sources are involved.

If the pump is then started, with by-pass valve 5 slightly open and bleed port 16p fully open, then valves 7p and 21p are adjusted to apportion the flow to the source 6s and in the line 20p until only the approximate requirement of the source 6s flows thereto. The criterion for this condition is an approach to a zero indication by the meter 18p. When this adjustment has been made, the portion of flow from the pump 2 which passes the meters 8p and 9p to the cross connection 14p roughly matches the fluid requirement of suction source 6s and the rate of this flow is indicated on meters 8p and 9p. The remainder of the flow provided by pump 2 is directed to ambient atmosphere through valve 21p. In this condition of the system very little or no fluid flows through lines 15p and 17p. A final adjustment is made by gradually closing the bleed port 16p with a finger and finally adjusting the valve 21p until the meter 18p reads zero. After this final adjustment no fluid flows through line 15p and no pressure exists in that line or in line 17p and the meters 8p and 9p give readings which are necessarily the rate of flow to the suction port, the said readings representing readings of the true rate of flow unimpaired at the suction port.

If a rough reading over a wide range of flows is adequate the meter 9p may be sufficient. If on the other hand a more sensitive indication is desired, the meter 8p is utilized, with a selection of ranges by adjustment of the valve 12p.

It should be noted that the pump supplies not only fluid necessary to balance the flow requirement of the suction source, but also supplies an excess of fluid which is released at bleed valve 21p, as well as the energy to overcome valve and meter back pressures and flow resistances. Energy in the form of fluid pressure or flow delivered by the pump 2 which is in excess of that necessary to overcome system losses and to balance the suction port requirement is directed out of bleed valve 21p and is not measured by the meters 8p and 9p. Thus the meter 8p measures only the rate of flow required to balance the rate of flow at suction port 6s and serves as a flow meter.

As previously stated, the valves 10p, 11p (and 12p) are used simply to calibrate the meter 8p and valves 10s, 11s (and 12s) to calibrate the meter 8s and are preadjusted. Accordingly, the main adjustments for the suction side of the system are those provided by valves 7p and 21p and the relative adjustments thereof, for any rate of flow generated by pump 2 controls the portions of said flow which flow through the system to vacuum source 6s and to atmosphere through the valve 21p. Similarly, valves 7s and 21s control flow from the pump to pressure source 6p and to atmosphere respectively.

The approximate value of the flow in the vacuum source may be determined by the tapered tube flow meter 9p to aid in calibration and to aid in determining approach toward a balanced condition. By selection of the flow by-passing the sensitive flow meter 8p, the pressure differential across the meter 8p is brought within its indicating range and the calibrated equivalent of the exact rate of flow in the vacuum source noted. Use of the manually closed bleed port enables the operator to make rough adjustments before exposure of the sensitive meters to abnormal conditions and thus prevent damage to the system.

Under conditions of balance of the meter 18p, the flow indicated by the meter 8p is the effective flow supplied by the pump 2 (i.e. pump output, minus losses through valves 5 and 21p) which matches the flow in the vacuum source. Consequently, the flow within the system involving the vacuum source is not disturbed or altered while the flow therein is being measured.

When the meter is utilized to measure a pressure source, the suction side of the meter is used in an identical manner.

The apparatus in which the flow is to be measured may involve both a condition of flow under pressure and a flow under suction pressure. In such case, the suction line 3s is connected to the pressure source and the pressure line is connected to the suction source. Both sides of the meter system are then employed in the manner hereinbefore described.

The systems may thus be utilized to give independent indications of the flow rates of mutually independent sources.

Where only one suction or pressure source is involved, the opposite side of the system need not be adjusted and the pump 2 simply draws its fluid (air) requirement from the open bleed paths (16p, 16s, 21p, 21s) in the side of the system not in use or from the open disconnected end of the instrument. Thus, in the example specifically described in the specification whenever suction in the port 6s is balanced by the pump 2, the pump draws necessary fluid from any or all of bleed port 16s, bleed valves 20s, pressure port 6p or (if desirable) from the usual inlet valving of the pump itself. Conversely if the rate of fluid flow at the pressure port 6p were being measured the pump connection to bleed port 16p, to bleed valve 21p and to suction port 6s would provide outflows from the pump.

Having thus described certain embodiments and applications of my invention, I do not desire to be limited thereto, but intend to claim all novelty inherent in the appended claims.

I claim:
1. A fluid flow meter system comprising:
(a) a pump having intake and discharge ports;
(b) A flow line for communication between one port of said pump and an external source of fluid flow, the rate of which is to be measured;
(c) flow means for communication between the other port of the pump and a body of fluid other than said source;
(d) a bleed line from said flow line to ambient atmosphere;
(e) valve means in said flow line and in said bleed line for dividing the flow through said pump into portions respectively to or from atmosphere and to or from said source so that the portion thereof in the flow line between said valve means and said source compensates for internal energy losses in the system and also provides a flow which is equal to and in the direction of flow at the source of flow to be measured to thereby balance the system;
(f) a balance meter communicating with said flow line adjacent said source for indicating said condition of balance;
(g) and a flow meter in said flow line between said valve means and said source for indicating the flow rate therein under said condition of balance, whereby the reading of said last named meter is a true reading of the rate of flow at the said source of flow.

2. A fluid flow meter system comprising:
(a) a pump having intake and discharge ports;
(b) a flow line for communication between the discharge port of said pump and an external vacuum source, the flow rate of which is to be measured;
(c) flow means for communication between the intake port of the pump and a body of fluid other than said source;
(d) a bleed line from said flow line to ambient atmosphere;
(e) valve means in said flow line and in said bleed line for dividing the flow from said pump into portions respectively to atmosphere and to said source so that the portion thereof in the flow line between said valve means and said source compensates for internal energy losses in the system and also provides a flow which is equal to and in the direction of flow at the source of flow to be measured to thereby balance the system;
(f) a balance meter communicating with said flow line adjacent said source for indicating said condition of balance;
(g) and a flow meter in said flow line between said valve means and said source for indicating the flow rate therein under said condition of balance, whereby the reading of said last named meter is a true reading of the rate of flow at said vacuum source.

3. A fluid flow meter system comprising:
(a) a pump having intake and discharge ports;
(b) a flow line for communication between the inlet port of said pump and an external pressure source, the flow rate from which is to be measured;
(c) flow means for communication between the discharge port of the pump and a body of fluid other than said source;
(d) a bleed line from said flow line to ambient atmosphere;
(e) valve means in said flow line and in said bleed line for dividing the flow to said pump into portions respectively from atmosphere and from said source so that the portion thereof in the flow line between said valve means and said source compensates for internal energy losses in the system and also provides a flow which is equal to and in the direction of flow at the source of flow to be measured to thereby balance the system;

(f) a balance meter communicating with said flow line adjacent said source for indicating said condition of balance;

(g) and a flow meter in said flow line between said valve means and said source for indicating the flow rate therein under said condition of balance, whereby the reading of said last named meter is a true reading of the rate of flow at said pressure source.

References Cited

UNITED STATES PATENTS 2,494,673  1/1950  Smith _____ 73—194
2,696,113  12/1954  Prescott et al. _____ 73—194

RICHARD C. QUEISSER, *Primary Examiner.*

E. D. GILHOOLY, *Assistant Examiner.*